P. J. FOY.
TRAFFIC SIGNALING DEVICE.
APPLICATION FILED SEPT. 22, 1916.

1,300,369.

Patented Apr. 15, 1919.
3 SHEETS—SHEET 1.

WITNESSES:
Philip N. Borman
Henry R. Wahl

INVENTOR.
PATRICK J. FOY
BY Daniel Brennan
ATTORNEY.

P. J. FOY.
TRAFFIC SIGNALING DEVICE.
APPLICATION FILED SEPT. 22, 1916.
1,300,369.
Patented Apr. 15, 1919.
3 SHEETS—SHEET 2.
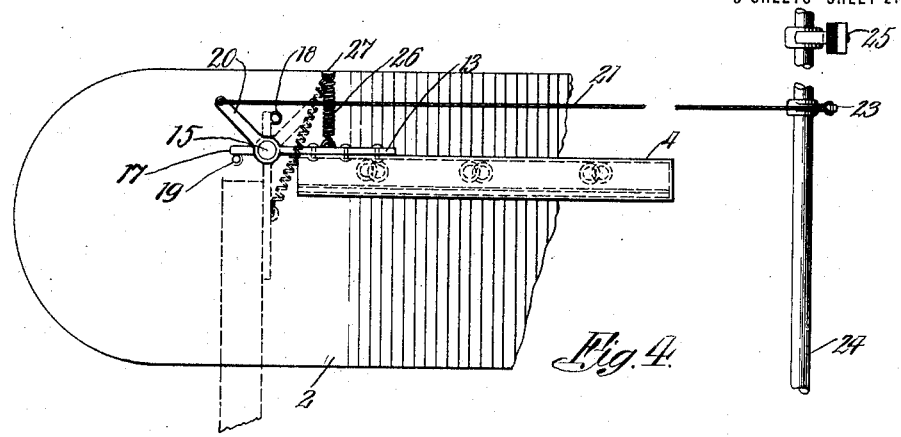
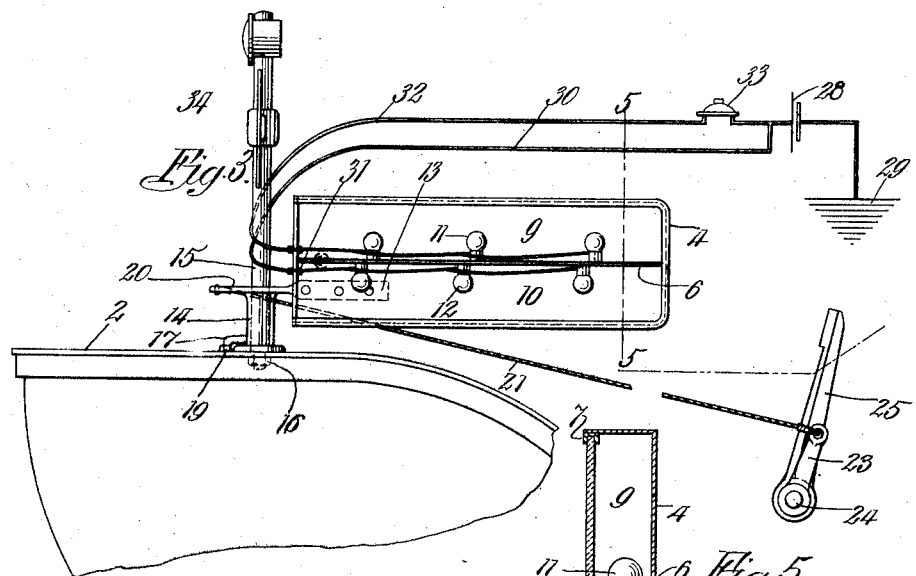
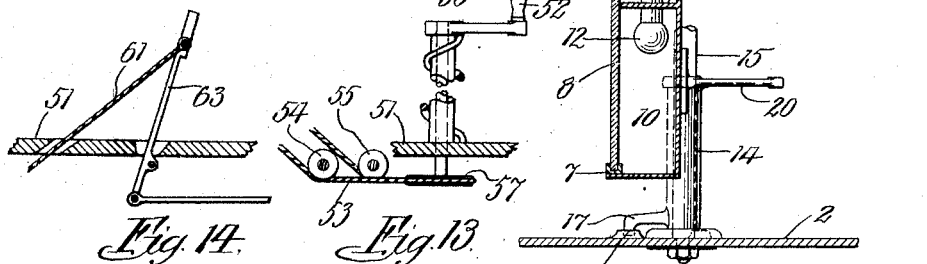
WITNESSES:
Philip K. Borman.
Henry R. Wahl.
INVENTOR.
PATRICK J. FOY
BY Daniel Brennan
ATTORNEY.

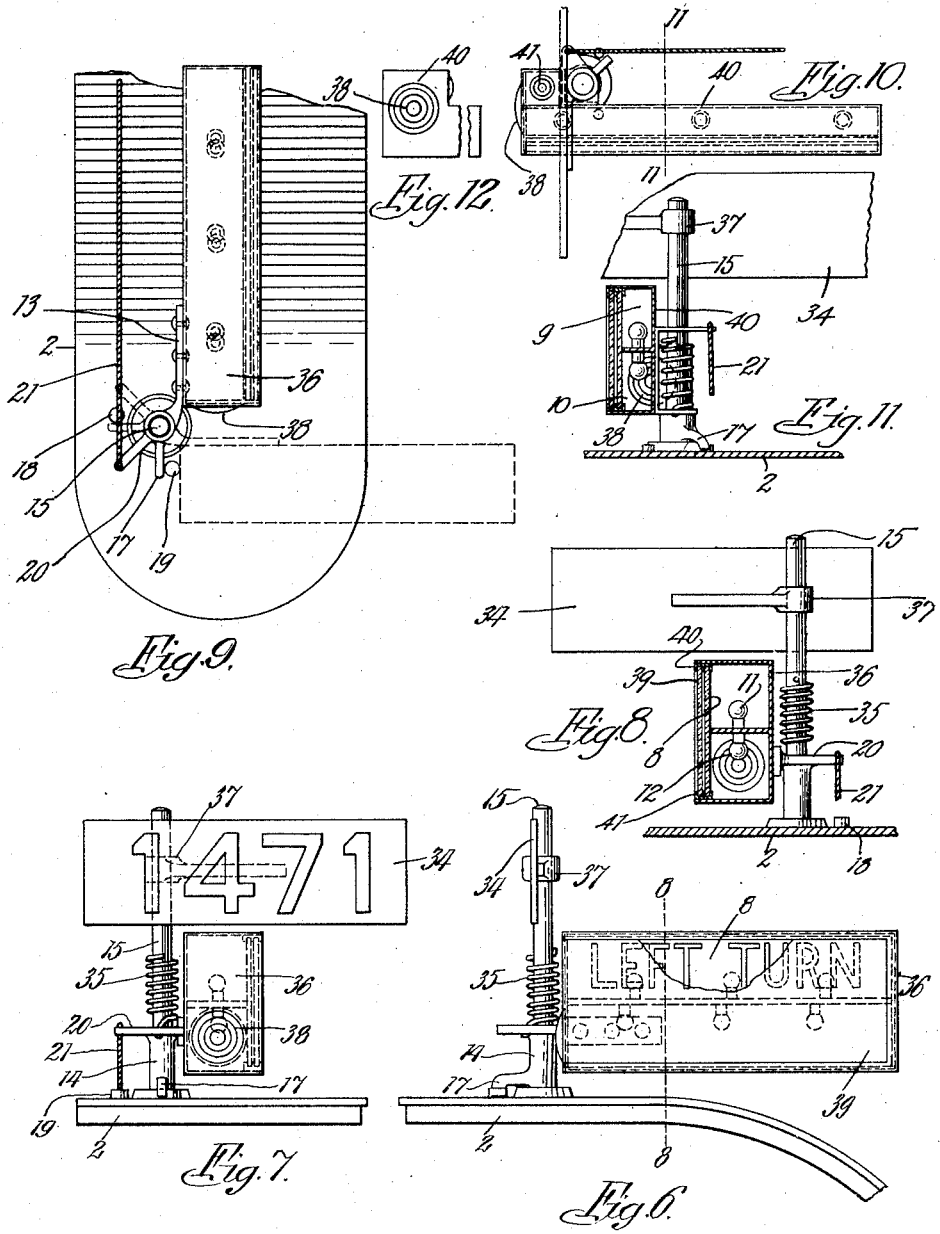

UNITED STATES PATENT OFFICE.

PATRICK J. FOY, OF CHICAGO, ILLINOIS.

TRAFFIC-SIGNALING DEVICE.

1,300,369. Specification of Letters Patent. Patented Apr. 15, 1919.

Application filed September 22, 1916. Serial No. 121,533.

*To all whom it may concern:*

Be it known that I, PATRICK J. FOY, a citizen of the United States, residing at Chicago, county of Cook, and State of Illinois, have invented certain new and useful Improvements in Traffic-Signaling Devices, of which the following is a specification.

The invention relates to improvements in traffic signal devices mounted on vehicles and serving the purpose of indicating to pedestrians or other vehicles that the operator of the vehicle which is equipped with the signal device intends to drive straight ahead, or to steer to the left, or to the right.

An object of the invention is to provide a signal device in combination with a vehicle and means within reach of the operator for actuating the signal device, which is preferably located near the rear of the vehicle.

Another object of the invention is to provide a signal device with illuminated inscriptions to indicate that the vehicle will make a turn to the right or left.

Another object is to provide, in combination with a vehicle, two of these signal devices, each serving by its motion from normal position for indicating one definite change in the direction which the vehicle will take.

Another object of the invention is to provide means for automatically returning each of the signal devices after displacement to their original position, as soon as the operator of the vehicle releases the element which he actuated for the purpose of displacing the traffic signal device.

Another object of the invention is to combine with a signal device of this character a device which may act as rear light for the vehicle, said rear light being displayed in the proper direction as long as the vehicle is either standing still or running straight ahead.

Another object of the invention is to provide a pair of signal casings adapted to indicate by their displacement from normal position whether the vehicle is going to turn to the right or left, and to combine one common operating mechanism with the two signal casings.

Another object is to combine means with the brake pedal for simultaneously displacing two signal devices to call the attention of the driver of a following vehicle to the fact that the other vehicle will stop.

Another object of the invention is to combine with a signal device of the character described a source of illumination for the number or license sign of the vehicle.

With these other objects in view a plurality of embodiments of the invention are shown in the accompanying drawing, the novel features of the invention being more particularly pointed out in the claims appended to the specification.

In the drawings:

Fig. 3 is an elevation of the signal device (with the front wall removed) and partly a diagrammatic illustration of the circuits for supplying current to the lamps of the device.

Fig. 4 is a top plan view of the signal device.

Fig. 5 is a sectional view of the signal device on line 5—5 of Fig. 3, this sectional view being on a somewhat larger scale.

Fig. 6 is a side elevation, with parts broken away, of a modified embodiment of the signal device and of the support of the same.

Fig. 7 is an end view of the signal device illustrated in Fig. 6.

Fig. 8 is a sectional view through the signal device illustrated in Figs. 6 and 7, the section being taken on lines 8—8 of Fig. 6.

Fig. 9 is a top plan view of the signal device shown in Figs. 6 and 7.

Fig. 10 is a top plan view of another modification of the signal device, showing means for illuminating a number or license sign supported above the movable signal device.

Fig. 11 is a sectional view of the last mentioned modification, the section being taken on line 11—11 of Fig. 10, and Fig. 12 is an end view of the modified form of the casing shown in Figs. 10 and 11.

Fig. 13 is a side elevation and partly section of the mechanism for actuating arbitrarily either one of the signal devices.

Fig. 14 is a side elevation of a device for actuating both signal elements simultaneously.

Figure 2:
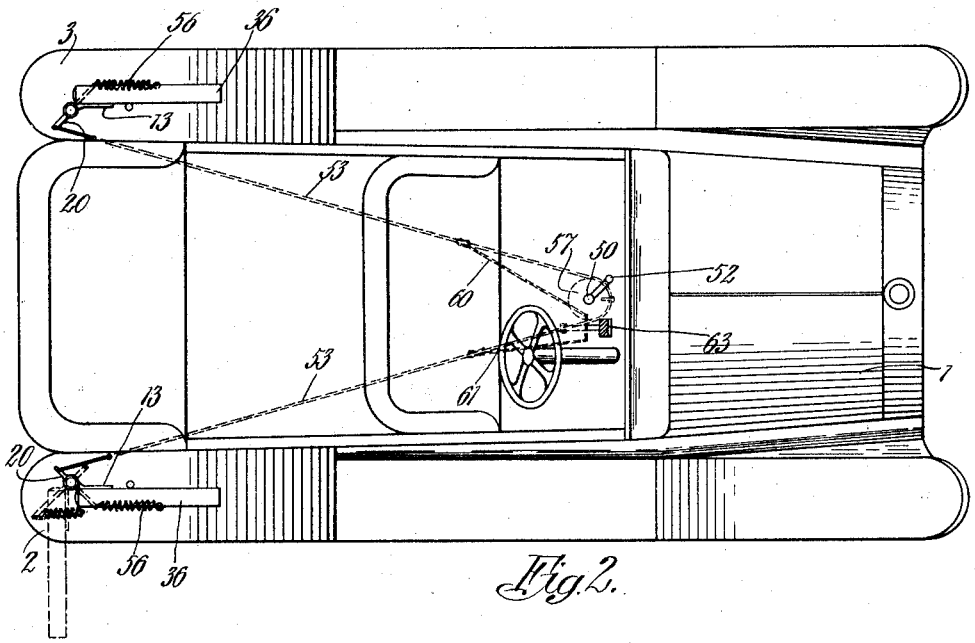
Fig. 2 is a top plan view of a vehicle equipped with two signal devices which may be operated from one common element.

The vehicle, for the purpose of illustrating and describing the invention, is shown as an automobile 1, which is provided with ordinary mud guards 2 and 3 over the rear and front wheels of the vehicle. The signal devices are supported on the mud guards, and, as may be seen from Figs. 1 and 2, the preferred location of the same is on the rear mud guards, although naturally any other position may be selected for the same. The signal device proper consists of a casing 4, preferably made of sheet metal, having a rear wall and lateral walls, all preferably made of sheet metal, and also a partition wall 6. The upper edges of the end and lateral walls are provided with small channel irons 7 adapted to receive a pane 8 of glass or other transparent material.

The partition wall 6 divides the casing 4 into upper and lower chambers 9 and 10, and also serves for the support of a plurality of incandescent lamps 11 and 12 respectively, which are mounted in the two chambers 9 and 10 and which have one of their terminals advisably connected with the metal of the partition wall (to ground the respective terminal), while the other terminal is insulated therefrom.

The casing 4 is supported on a post by means of a bracket 13 integral with a rotatable sleeve 14, which surrounds the post, the post being securely held to the mud guards 2 and 3, as, for instance, by the nut 16. The rotatable sleeve 14 loosely surrounding the post 15 preferably has a radial arm 17, which at its free end projects downwardly so as to come into engagement with bosses 18 or 19 on the surface of the mud guard. Another radial arm 20 of the sleeve 14 has its free end connected to a flexible member 21, which extends from the said arm 20 to the actuating device, which is located within the reach of the foot or hand of the driver. From Fig. 1 it is apparent that the flexible member 21 is guided over a sheave or pulley 22 so as to be held in proper tension.

Figure 1:
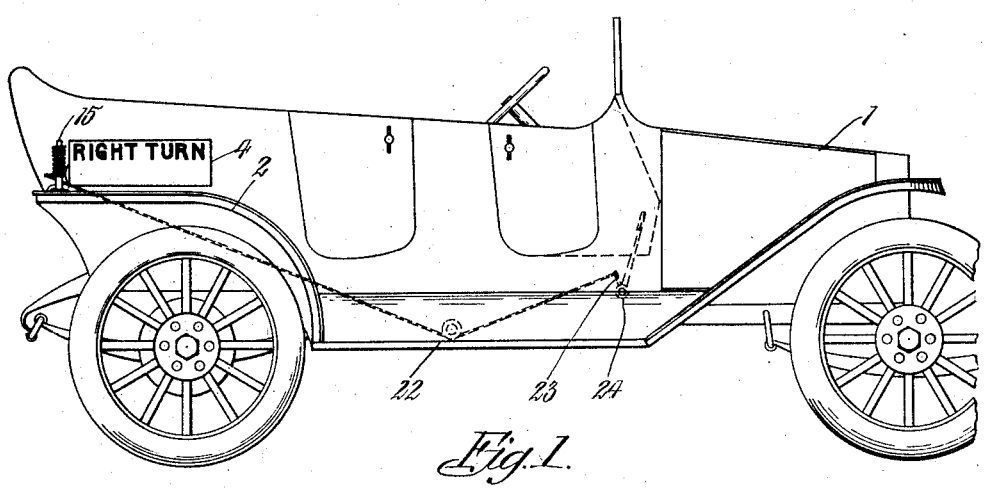
Figure 1 is a side elevation of a vehicle, showing a signal device with actuating means for the same.

In the embodiment of the invention illustrated in Figs. 1, 3 and 4, the flexible member 21 is secured to an arm 23, which is rigidly mounted on a rock shaft 24 extending partly across the automobile near the dashboard; this rock shaft 24 is suitably supported in the body or chassis of the vehicle and is provided with a treadle or pedal 25 projecting upwardly from the shaft into reach of the operator's foot. The bracket 13 is attached to a helical spring 26, one end of which is secured to a fixed point on or near the body of the vehicle or on the mud guard, as indicated at 27 in Fig. 4.

In this embodiment one separate rock shaft 24 and one separate pedal 25 must be provided for each signal box 4, although in the drawing the actuating device for the left hand signal casing only is shown. A similar shaft 24, arm 23, pedal 25 and cable 21 would be used for the right hand casing 4.

Current may be supplied to the incandescent lamps 11 and 12 of each signal device by means of a battery, diagrammatically shown at 28, Fig. 3; a conductor extending from one pole of the battery is grounded at 29, while a conductor 30 extending from the other pole of the battery is connected with the non-grounded terminals of the incandescent lamps 12 in the lower chamber 10 of the casing 4. When it is not desired to use the lower set of lamps, as for instance in day time, the current through the conductor 30 may be interrupted at the contact plug 31, through which the conductor 30 joins the wiring for the lamps in the lower chamber. Another conductor 32, also extending from the battery 28 and having the same polarity as the conductor 30, leads to the upper set of lamps 11, this conductor containing a switch shown conventionally in the form of a push button 33.

It is to be noted that the upper half of each translucent or transparent pane 8 forming the front wall of a casing 4, carries a suitable inscription, as, for instance, "Left turn" or "Right turn", respectively, in accordance with the change of direction at which the pertaining signal device will be operated. If the operator desires to indicate to a vehicle in the rear of his own vehicle that he is going to steer to the right or to the left, he presses on the respective treadle 25, thereby rocking the shaft 24 and the arm 23, which is connected by the flexible member 21 to the arm 20. The pull on the flexible member 21 will impart a motion to the arm 20 forming part of the sleeve 14, and thereby the pertaining casing 4 will be swung in a position in which the front wall 8 is displayed at a right angle to the plane of the side wall of the vehicle, as shown in dotted lines in Fig. 4. In this part-rotation of the sleeve 14 about the rigid post 15, the arm 17, which prior to this oscillation was in contact with the stop 19, is now moved into engagement with the stop 18, as shown in Fig. 4. As soon as the pressure on treadle 25 is released the casing 4 will be returned into the position shown in full lines in Fig. 4, owing to the pull of the spring 26 on said casing. The arm 17 of the sleeve 14 then again comes into engagement with the stop 19 of the mud guard.

If the device is to be used at night, the conductor 30 may be inserted into the contact plug 31, so that the lamps 12 in the lower chamber of the casing 4 are illuminated permanently, thereby indicating to the police or supervising officials that the vehicle is equipped with the necessary devices for indicating to following vehicles any change of direction. If then the operator desires to steer to the right or left, he closes the switch 33, thereby also supplying current to the lamps 11 in the upper chamber of the casing 6, and illuminating the legend on the transparent pane 8 of the casing.

From Fig. 3 it will be noted that the post 15, serving as a support for the semaphore or signal box 4 is extended beyond the height of the box and serves as a support for the license shield or sign 34, the plane of which is preferably approximately parallel to the rear wall of the vehicle 1.

In the modification of the invention as shown in Figs. 6, 7, 8, and 9 the tension spring 26 is replaced by a torsion spring 35, which surrounds a portion of the stem 15 above the sleeve 14, one end of the spring being fastened to the post and the other being fastened to the bracket 13, which is formed integral with, or is connected with, the sleeve 14. In this case it is also evident that upon a pull on the flexible member 21 the semaphore casing 36 may be swung about the post 15 until it reaches the position indicated in Fig. 9 in dotted lines. The two end positions of the casing 36 are again limited by contact of the arm 17, forming part of the sleeve 14, with one or another of the stops 19 and 18. In this modification the post 15 also is extended beyond the upper end of the spring 35 and supports a bracket 37 on which the number sign or license shield 34 is mounted. One end wall 5 of the casing 36 is different from the corresponding end wall of the casing 4, shown in Figs. 3 and 4, inasmuch as the end wall 5 contains a bull's-eye lens 38, which can be made of colored glass so as to comply with the police requirements of some countries, which prescribe the provision of a colored rear light.

The front or transparent closure of the casing 36 also is different from that of the casing 4, inasmuch as two glass panes 8 and 39 are located in suitable double channel irons 40 and 41. The outer glass pane 39 serves as a protection of the inner pane 8; it may be made of frosted glass, and may therefore hide normally the legend which is printed or painted on the upper portion of the inner glass pane 8. The painting on the inner glass pane 8, therefore, will be invisible during the daytime, or as long as the upper lamps 11 in the casing 36 are not supplied with current.

The modification shown in Figs. 10, 11 and 12 includes a relatively long, narrow casing 40, which is enlarged near one end so as to have an L-shaped outline, seen in plan view, Fig. 10. The top wall of the casing 40 carries near the short angular leg of the L a bull's-eye lens 41, which reflects normally the light upwardly against the number sign or license shield 34, supported by the post 15. The end wall of the container 40 also carries a bull's-eye lens 38, acting as a rear light and similar to the construction shown in Figs. 6 and 7.

It will be seen that this semaphore box not only is suitable to act as an indicator, but that it will also act as rear light and as a source of illumination for the license sign.

In the modification of the device illustrated by Figs. 2, 13 and 14, one common mechanism serves for arbitrarily actuating the left hand or right hand signal device. The post 50, rotatably supported in the foot-board 51 near the driver's seat, carries at its upper end an offset portion or crank 52, which may be turned by the driver's foot in one direction or in the opposite direction. The end of the post 50 projecting below the board 51 carries a sheave or pulley 57 (Fig. 13), about which one or more turns of the flexible member 53 are trained. The ends of the flexible member 53 are secured to arms 20, which form parts of the brackets 13 to which the semaphore casings 36 are attached. The flexible member 53 is guided underneath the body of the car by means of suitable sheaves or pulleys 54, 55 (Fig. 13), and this flexible member is passed through the mud guards 2 and 3 near the rear end of the same through suitable holes provided for this purpose.

If, as seen in Fig. 2, the crank 52 is rotated in the same direction as the hands of a watch, the upper portion of the flexible member 53 will be wound up on the sheave 57 and the left hand semaphore signal 36 will therefore be swung into a position to indicate that the driver intends to turn to the left. As soon as the pressure on the crank 52 is released, the spring 56, which has been placed under tension owing to the part rotation of the casing 36, will exert a pull on the flexible member 53 and will partly unwind the same again from the sheave 57, so that all parts are restored to that position in which they are shown in Fig. 2.

If the crank 52 is rotated in a direction opposite to that in which the hands of a watch rotate, the other portion of the flexible member 53 will be wound up; on the sheave 57 the other spring 56 will be placed under tension and the right hand semaphore casing is swung into the position shown in dotted lines.

If the driver desires to signal to any vehicle in the rear of his own, that he intends to stop, both of the signal devices 36 may be swung out at the same time. For the purpose of actuating both of the signal devices 36 simultaneously, bridles 60 and 61 are connected with a brake actuating pedal 63, which is disposed in the foot-board near the driver's seat, as shown in Fig. 1. The other ends of the bridles 60 and 61 are attached to different portions of the flexible member 53. It is obvious, therefore, that upon depression of the brake pedal 63 both of the flexible portions 53 will be actuated under tension and both of the casings 36 will be rotated into display position at the same time.

I claim—

1. In a traffic signal device for a vehicle, the combination of a pair of semaphore casings, each disposed at a side of the vehicle, means within reach of the driver of the vehicle and common to both of said semaphore casings for arbitrarily moving either one of said casings, a flexible element extending from said semaphore casings to said actuating means and means connected with the flexible element for simultaneously moving both of said semaphore casings into display position.

2. A traffic signal device of the character described, comprising in combination with a vehicle, a pair of semaphore casings, a post for each of said semaphore casings to which the casing is pivotally attached, a rotary post mounted near the driver's seat, a pulley secured to said last named post, a flexible member trained around said pulley and connected to each of said semaphore casings, for arbitrarily moving either one of said semaphore casings, and means connected with the flexible member for simultaneously moving said semaphore casings to display position.

3. In a traffic signal device for a vehicle, the combination with a pair of semaphore casings, each pivotally mounted on one side of the vehicle, of a common means for arbitrarily moving either one of said semaphore casings into display position, a brake pedal, and means connected with the brake pedal and said first named means for simultaneously moving both of said semaphore casings into display position.

4. In a traffic signal device of the character described, the combination of a pair of indicating elements pivotally mounted each on one side of the vehicle, means for arbitrarily moving either one of said indicating elements into display position, a brake actuating device, and means connected with the brake actuating device and with said first named means for simultaneously moving both of said indicator elements into display position.

5. In a traffic signal device for vehicles, the combination of a pair of illuminated casings, posts on the vehicle to which said casings are pivotally attached, a transparent wall forming part of each casing, a partition wall coextensive with each casing and dividing the latter into an upper and lower chamber, sets of lamps within the chamber of said casings, one set of lamps illuminating a legend on the upper portion of the transparent wall, and means within reach of the driver of the vehicle and common to both of said illuminating casings for arbitrarily moving either one of said casings into display position, a brake element and means connecting the brake element with the moving means, for simultaneously moving both of said casings to display position.

PATRICK J. FOY.

Witnesses:
HENRY R. WAHL,
DANIEL A. BRENNAN.

Copies of this patent may be obtained for five cents each, by addressing the "Commissioner of Patents, Washington, D. C."